(12) United States Patent
Yilmaz et al.

(10) Patent No.: US 8,559,414 B2
(45) Date of Patent: Oct. 15, 2013

(54) AUTOMATICALLY DETECTING BEST PATHS FROM SHADOW ROUTE REFLECTORS

(75) Inventors: Selma Yilmaz, Mountain View, CA (US); Keyur Patel, San Jose, CA (US); Nitin Kumar, Bangalore (IN); Robert Raszuk, Warsaw (PL); Satish Mynam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 13/031,188

(22) Filed: Feb. 19, 2011

(65) Prior Publication Data

US 2012/0213218 A1    Aug. 23, 2012

(51) Int. Cl.
*H04L 12/28* (2006.01)
(52) U.S. Cl.
USPC ................ 370/351; 706/12; 709/239
(58) Field of Classification Search
USPC ................ 370/351; 709/239; 706/12
See application file for complete search history.

(56) References Cited

U.S. PATENT DOCUMENTS

| | | | | |
|---|---|---|---|---|
| 7,532,631 | B2 * | 5/2009 | Raszuk et al. | 370/401 |
| 7,599,313 | B2 * | 10/2009 | Patel et al. | 370/254 |
| 2007/0162614 | A1 * | 7/2007 | Patel et al. | 709/239 |
| 2008/0089348 | A1 * | 4/2008 | Appanna et al. | 370/401 |
| 2012/0093166 | A1 * | 4/2012 | Rosenberg et al. | 370/401 |
| 2012/0158942 | A1 * | 6/2012 | Kalusivalingam et al. | 709/224 |

\* cited by examiner

*Primary Examiner* — Dang Ton
*Assistant Examiner* — Mewale Ambaye
(74) *Attorney, Agent, or Firm* — Hickman Palermo Truong Becker Bingham Wong LLP

(57) ABSTRACT

In an embodiment, a method comprises receiving a path advertisement comprising information about an available path and a well-known community value associated with the available path. A modified best path calculation is performed in response to receiving the available path either from a higher-ranked device or from a device that is not participating in diverse path calculation, resulting in creating a particular best path. The particular best path is advertised to other routers with or without a restriction indicator based on whether it is a client learned path or non-client iBGP peer learned path and based on whether the advertisement is directed to a client or a non-client iBGP peer.

20 Claims, 5 Drawing Sheets

AUTOMATICALLY DETECTING BEST PATHS FROM SHADOW ROUTE REFLECTORS

TECHNICAL FIELD

The present disclosure is generally related to communications between routers, switches or other computers of a distributed network infrastructure and specifically relates to distribution of diverse best paths within an autonomous system.

BACKGROUND

Internet Service Provider networks are generally multi-homed and have multiple external Border Gateway Protocol (eBGP) links with external subnets. The peering between the neighbors provides an abundance of alternate paths at a border of an autonomous system towards external subnets. However, an internal BGP (iBGP) peer typically is merely aware of one best path to each of the peer's neighbors.

Existing path-vector-routing protocols, such as the Border Gateway Protocol (BGP), require routers to advertise only a best path to a given destination. Because the path-vector-routing protocols are not designed to allow routers to advertise a second best path or other next-best paths, routers cannot fully exploit existing redundancies of underlying network infrastructure.

Using route reflectors is one of the main reasons for poor path diversity within an autonomous system. In a network with a route reflector, even if the route reflector learns that diverse routes exist to a given destination, the route reflector may only reflect the best path to that destination.

A technique termed the "Best External" approach, described in the internet-draft document "draft-marques-idr-best-external-01.txt," has claimed to improve the path diversity within an autonomous system. However, the diverse paths generated according to the "Best External" approach are not redistributed to all the routers inside the autonomous system and thus, the majority of the routers know merely a single external route to each of their neighbors.

The "Diverse Path" approach described in the internet draft "draft-raszuk-diverse-bgp-path-dist-00," proposes adding shadow route reflectors for each primary route reflector to calculate and advertise the second, third, fourth, and other ($n^{th}$) best paths. The primary route reflector is called a first plane or a best-path route reflector, and computes and advertises the best path. The first shadow route reflector is called a second plane route reflector, and computes and advertises the second best path. The second shadow route reflector is called a third plane route reflector, and computes and advertises the third best path. The $n^{th}$ shadow route reflector is termed the $n^{th}$ plane route reflector, and computes and advertises the $n^{th}$ best path. The first, second, third, ... $n^{th}$ best paths are diverse as they have different next hops, so that the remote provider edge router can have multiple paths with different exit points for the same prefix.

However, in the "Diverse Path" approach if the route reflectors at different planes are not co-located due to a possible variance in an Interior Gateway Protocol (IGP) metric, a proper calculation of the diverse paths cannot be guaranteed An existing route reflector can be used as a shadow route reflector, but even if peering is established between a first plane route reflector and a second plane route reflector, the units may not exchange best paths due to route reflector rules. Further, even if the units do exchange best paths, the units may be unable to distinguish whether a received best path originated from the $i^{th}$ plane route reflector or some other route reflector that is not participating in diverse path calculation.

The best path calculation in the "Diverse Path" approach requires a significant number of iterations. For example, the second best path calculation at a second plane route reflector requires two iterations; the third best path calculation at a third plane route reflector requires three iterations, and so forth.

The "Add Path" approach described in "draft-ietf-idr-add-paths-00" requires significant modifications to the routing protocol. Further, Add Path is not backward compatible and requires upgrades throughout the network to function.

DETAILED DESCRIPTION

Figure 1:
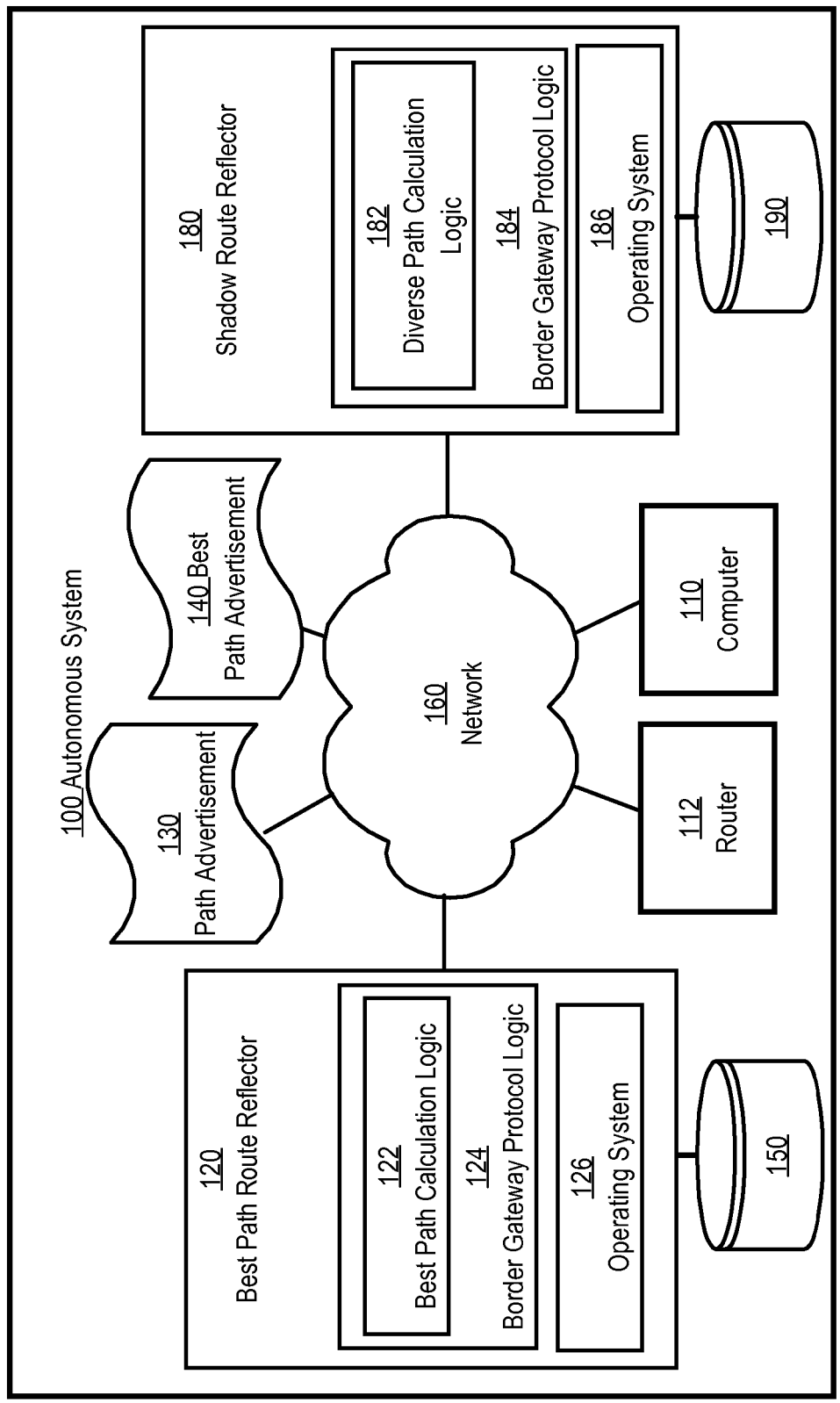
FIG. 1 illustrates an embodiment of an autonomous system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview of an Autonomous System
3.0 Process of Selecting the Best Path by a Route Reflector
4.0 Structural and Functional Overview of a Group of Autonomous Systems
5.0 Process of Selecting the Best Paths by Route Reflectors
6.0 Deployment Considerations
7.0 Implementation Mechanisms—Hardware Overview
8.0 Extensions and Alternatives
1.0 General Overview In an embodiment, a method performed by one or more processors comprising a data packet router comprises receiving a path advertisement comprising information about an available path and a well-known community value associated with the available path, wherein the well-known community value indicates a rank; in response to determining that the available path is a best path from a higher-ranked device, computing, using data stored in a connectivity database, a particular best path; in response to determining that the available path is a best path from a lower-ranked device, storing the information about the available path in the connectivity database, computing the particular best path using data stored in the connectivity database; advertising, to other routers, the particular best path with a router well-known community value associated with the data packet router.

In an embodiment, a method, performed by one or more processors, comprises receiving a path advertisement containing information about an available path and a community value associated with the available path. The available path included in the path advertisement may be the best path that a sender of the path advertisement selected as its best path. In an embodiment, a sender of the path advertisement may be any type of a router. For example, the sender may be a route reflector, a best-path route reflector, or a shadow route reflector.

Available paths are associated with path attributes. Some relevant path attributes are LOCAL_PREF, NEXT_HOP, and COMMUNITY. The LOCAL_PREF attribute indicates local preferences of the router with respect to the path and the path with the highest LOCAL_PREF value is chosen as the best-path. The NEXT_HOP attribute indicates the next-hop node in the path, which is the address of a BGP router at the border of an AS (otherwise known as an egress point)

The community attribute is defined in RFC 1997 and certain community values are defined as well-known communities. A well-known community value mandates specified behavior in a supporting node. For example, the NO_ADVERTISE well-known community instructs routers not to advertise the route received with this attribute to any other BGP peers, not even iBGP peers. Further information about conventional use of BGP communities is found in RFC 1997, with which the reader is presumed to be familiar, and the details of which are not repeated herein for clarity.

In an embodiment of the present approach, the value of a particular new well-known community attribute may be used to determine a ranking of the best path in a scheme of all diverse paths generated by the reflectors of different planes in an autonomous system. For example, the new well-known community attribute disclosed herein may have an associated value that indicates whether the corresponding path is the best path, the second best path, the third best path or the $n^{th}$ best path.

In an embodiment of the present approach, values associated with the new well-known community attribute disclosed herein may be selected based on various schemes. For example, the values may be integers selected in such a way that a lower community value indicates a higher ranked best path. For instance, the community value of "1" may indicate the best path to a given destination; the community value of "2" may indicate the second best path to the destination; the community value of "3" may indicate the third best path; and so forth.

The new well-known community attribute value disclosed herein may also be used to indicate ranking of the planes that route reflectors belong to. The new well-known community attribute value may also be used to indicate a ranking of the reflector that computed and advertised the particular best path. For example, the best-path route reflector is the first plane route reflector. First plane may be the highest ranked plane and the best-path route reflector may be the highest-rank route reflector among the shadow router reflectors of other planes within the autonomous system. The best-path route reflector may advertise its best path with the well-known community value of "1" to indicate that the best path it is advertising is the first plane route reflector's best path. Similarly, the second plane shadow route reflector may advertise its best path, which is the second best path, with the community value of "2" to indicate that it is the second best path and it is computed by second plane route reflector. While the first plane may be the highest ranked plane, the first plane route reflector may be the highest-rank route-reflector, and the best path may be the highest ranked path among diverse paths, the second plane may be next the highest ranked plane, the second plane route reflector may be the next highest-rank route-reflector, and the second best path may be the next highest ranked path among diverse paths. For purposes of illustrating clear examples, certain embodiments described herein refer to two diverse paths and two shadow route reflectors; however, embodiments may be used with any number n of diverse paths and shadow route reflectors.

In an embodiment, the new well-known community attribute value is included in the path advertisement of the available path and indicates the ranking of the route reflector that selected the available path as its best path.

In an embodiment, the method further comprises determining whether the available path is a higher-ranked device best path. In one approach, the determining involves testing whether the well-known community value associated with the available path is lower than the well-known community value that will be associated with the best path of the router that received the path advertisement and in the process of computing its best path. If the well-known community value associated with the available path is lower than the well-known community value that will be associated with the best path of the router that received the path advertisement and in the process of computing its best path, then the available path advertised in the received path advertisement was computed and advertised by a reflector that has a higher rank than the reflector that received the path advertisement. For instance, if the well-known community value associated with the path advertised by the peer is "1" and the router receiving this advertisement is a $2^{nd}$ plane route reflector, then the available path was computed and advertised by the higher-ranked device than the device that received the path advertisement and the available path is the best-path route reflector's best path.

In an embodiment, the available path is stored in a connectivity database if the default BGP behavior does not prevent doing so. The relative ranking of the available path at the receiving router does not affect the decision whether the available path will be stored in the connectivity database. However, if the available path has a well-known community value associated with it indicating the relative ranking of the path, then this information is stored along with the available path in the connectivity database.

In an embodiment, the method further comprises computing, using data stored in a connectivity database, a particular best path in response to receiving the available path either from a higher-ranked device or a lower-ranked device. During the calculation of the particular best path, each path that has been learned and stored in the connectivity database is examined to check if it is from a higher-ranked device. The method excludes all the higher-rank device learned paths in the connectivity database. Furthermore, the method also excludes the paths for which the next-hop values match any next-hop value of the paths that have been learned from a higher-ranked device. Such exclusions of the paths during the calculation of a particular best path prevent the route reflector from computing a best path that is identical to any of the best paths already computed by the higher-ranked devices. It also prevents the route reflector to calculate a particular best path that is not diverse. The best path calculated this way becomes the particular best path of this route reflector. For example, it is the $i^{th}$ best path if the route reflector is $i^{th}$ plane router reflector.

In an embodiment, the method further comprises determining that the available path is a best path from a lower-ranked device. For instance, if the well-known community value associated with the advertised path was "2" and the router that received the path advertisement was the first plane route reflector, then the available path was computed and advertised by a lower-ranked device than the device that received the path advertisement, and the available path is the best path of the second plane shadow route reflector.

In an embodiment, during the calculation of the particular best path, the method does not exclude the paths that have been learned from a lower-ranked device and stored in the connectivity database. Therefore, the computed particular best path does not have to be different from the received available path if it has been learned from a lower-ranked device or from any of the lower-ranked device learned paths in the connectivity database. Because such paths were computed and advertised by the lower-ranked devices, they may be preempted by this higher-ranked route reflector due to its current best path choice.

In an embodiment, the method further comprises assigning the new well-known community value to the particular best path and advertising the particular best path with this new well-known community value to the other routers. Each route reflector involved in the calculation of diverse path knows which plane it belongs to; probably via configuration. If the router advertising the particular best path is the $i^{th}$ plane route reflector, the particular best path it is advertising is the $i^{th}$ best path, and the value "i" may be used as the new well-known community value associated with this particular best path.

In an embodiment, a non-transitory computer-readable storage medium stores one or more sequences of instructions which, when executed by one or more processors, cause the one or more processors to perform the processes described herein. In an embodiment, a data packet router or switch comprises logic that is configured to execute the processes described herein.

In an embodiment, the route reflectors of each plane are fully meshed with iBGP peering.

If an embodiment is implemented using a well-known community value, then each route reflector only needs to receive data indicating whether the received advertisement is coming from a lower-ranked device or higher-ranked device. The best path route reflector and each shadow route reflector may only have data indicating which plane they belong to via configuration. An alternative implementation can involve configuring each plane route reflector in such a way that the purpose of configuration is not just informing the route reflector about which plane it belongs to and which particular best path it is supposed to calculate, but also to inform the route reflector about other plane route reflectors with which it is peering. In these embodiments, iBGP peering is expected between the best path route reflector and among all of the corresponding shadow route reflectors. Full mesh connectivity is assumed.

At an $i^{th}$ plane route reflector, configuration can inform the route reflector more about its neighbors, such as which plane each neighboring route reflector belongs to. In this alternate implementation, the well-known community attribute is not needed in the best path advertisements. Each route reflector knows which plane it belongs to, which connotes its rank, and which plane each of its neighbors belongs to and thus its rank. The best path advertised by neighbor x that was configured to be in plane j is the $j^{th}$ best path. Because the iBGP peering among different plane route reflectors is full-mesh, each plane route reflector knows about each other router's ranking compared to itself via configuration.

For purposes of illustrating clear examples, certain embodiments described herein refer to two diverse paths and two shadow route reflectors; however, embodiments may be used with any number n of diverse paths and shadow route reflectors.

2.0 Structural and Functional Overview of an Autonomous System

Figure 2:
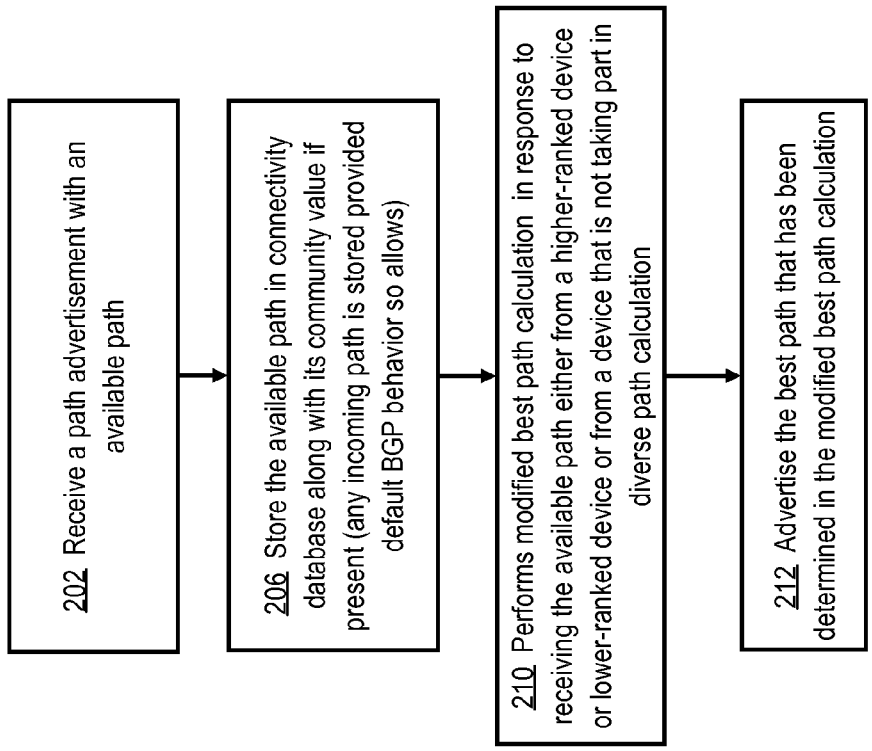
FIG. 2 illustrates an embodiment of a process of selecting the best path by a route reflector.
Figure 5:
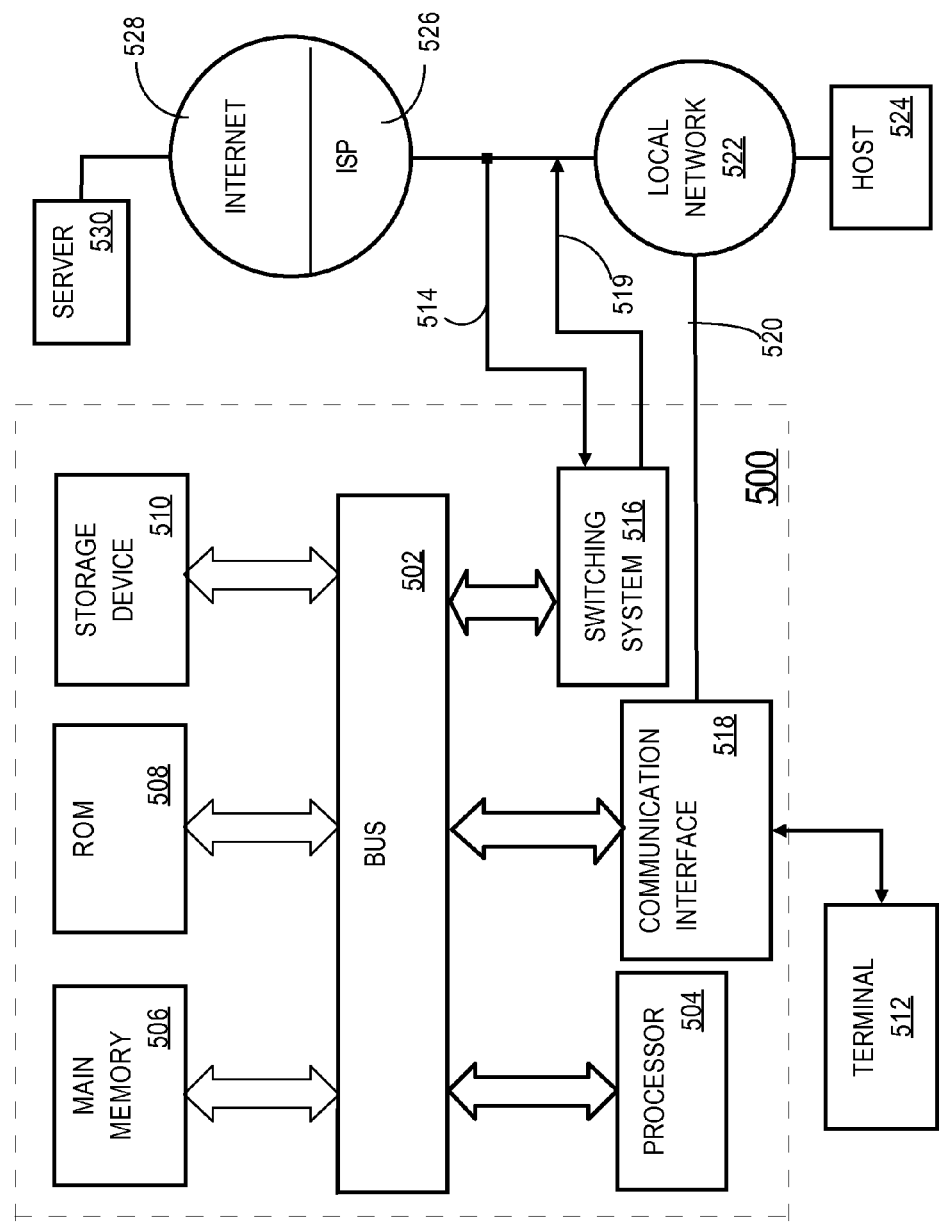
FIG. 5 illustrates a computer system upon which an embodiment may be implemented.

FIG. 1 illustrates an embodiment of an autonomous system; FIG. 2 illustrates an embodiment of a process of selecting the best path by a route reflector; FIG. 5 illustrates a computer system upon which an embodiment may be implemented.

Referring first to FIG. 1, in an embodiment, an autonomous system (AS) 100 comprises one or more computer systems 110, one or more routers 112, a best-path route reflector 120 and one or more shadow route reflectors 180. Computer systems 110, routers 112, best-path route reflectors 120 and shadow route reflectors 180 communicate using a network 160. Network 160 broadly represents one or more local networks, wide area networks, internetworks, or a combination.

For simplicity and for purposes of illustrating clear examples, FIG. 1 shows details of one computer system 110, one router 112, one best-path route reflector 120 and one shadow route reflector 180. However, practical embodiments may use any number of instances of computer system 110, router 112, best-path route reflector 120 and shadow route reflector 180.

Computer system 110 may be any type of a computer, such as a special-purpose computer, router, switch, or general purpose computer, and may use hardware logic such as in an application-specific integrated circuit (ASIC), field-programmable gate array (FPGA), system-on-a-chip (SoC) or other combinations of hardware, firmware and/or software.

Autonomous system 100 may be established using a network of inter-connected computers, such as a corporate intranet or the Internet. The computers within the autonomous system 100 communicate with each other directly or via routers 112. The computers within the autonomous system 100 send communications data sent via communication paths. Communication paths may be created through network 160 to allow a computer on one end of a path to communicate with a computer on another end of the path.

The primary function of a router 112 is to exchange network reachability information with other devices connected to network 160. The reachability information is used to store data values in memory that represent a graph of connectivity between the autonomous system 100 and other autonomous systems and devices.

Router 112 may exchange routing information between computer systems 112 using various data communication protocols. For example, router 112 may use the Border Gateway Protocol (BGP). Details about BGP are provided, for example, in "Terminology for Benchmarking BGP Device Convergence in the Control Plane," RFC 4098, by H. Berkowitz et al., published in June 2005, and in "Border Gateway Protocol 4 (BGP-4)," RFC 4271, by Y. Rekhter, T. Li, and S. Hares, published in January 2006.

BGP is a path-vector-routing protocol for distributing routing information to devices in a network. Devices implementing BGP maintain a stored table of data values representing Internet Protocol (IP) networks or "prefixes" that are reachable from a given autonomous system. Logic implementing BGP in a router makes routing decisions based on available paths, network policies and rule sets.

In an embodiment, router 112 may be an edge router (ER). An ER may be placed at the edge of an Internet Service Provider (ISP) network. The ER may communicate with devices in other autonomous systems, such as Service Providers or large enterprise autonomous systems, using external BGP (eBGP). This type of router is also called a Provider Edge (PE) router.

In an embodiment, router 112 may be a subscriber edge router (SER). A SER is located at the edge of the subscriber's network, and using eBGP communicates with its provider's autonomous system. This type of router is also called Customer Edge (CE) routers.

In an embodiment, router 112 may be an inter-provider border router. An inter-provider border router maintains BGP sessions with other BGP speaking routers in other providers' autonomous systems.

In an embodiment, router 112 may be a core router. A core router is one that resides within an autonomous system as a back-bone to carry traffic between edge routers. Core routers may also have specialized functions in virtual private networks based on a combination of BGP and the Multi-Protocol Label Switching (MPLS) Protocol.

In certain embodiments, a router 112 comprises networking infrastructure elements such as any type of a router, switch, firewall or gateway, each of which may be implemented on one or more general-purpose computers hosting or executing data communication software implementing, for example, a router. Examples of routers may include, Cisco 7600 Series Routers commercially available from Cisco Systems, Inc., San Jose, Calif.

According to BGP, internal BGP (iBGP) sessions are used to distribute reachability information among the routers that belong to the same autonomous system, while external BGP (eBGP) sessions are used to exchange inter-domain reachability information among adjacent routers that belong to different autonomous systems. The BGP routers within an autonomous system are allowed to advertise only eBGP learned routes over iBGP sessions.

BGP speakers within an autonomous system may be fully meshed so that external routing information can be distributed to all routers within the autonomous system. A full mesh provides the best possible path diversity within an autonomous system. In a fully meshed autonomous system, every BGP router can learn about existence of every exit point to a given destination. However, due to scalability problems, full meshing of all BGP routers within an autonomous system is impractical and presents deployment problems in large BGP networks.

Route reflection can address the scalability problem of a full mesh. A route reflector is a router that hosts logic configured to perform route reflection functions. Route reflectors are described, for example, in P. Traina, "Autonomous System Confederations for BGP," RFC1965, June 1996.

T. Bates et al., "BGP Route Reflection," RFC 4456, by T. Bates, E. Chen, R. Chandra, April 2006 assert that the deployment of route reflectors is one of the main reasons of poor path diversity within an autonomous system. In a network with route reflectors, even if a prefix is learned from multiple egress routers, a route reflector reflects only its best path to its clients.

The main problem with conventional route reflection is potential lack of visibility of some routes. A client router of a route reflector typically does not receive diverse routes to the same destination, even though such diverse routes would have been received if the full-mesh approach were implemented in the network. Therefore, the use of conventional route reflection limits route diversity in the network.

In an embodiment, route reflectors are configured for disseminating diverse paths to clients and non-clients. In an embodiment, while the route reflector 120 is advertising the best path, the shadow route reflector 180 helps distributing the diverse path within autonomous system 100. Route reflector 120 and shadow route reflector 180 are not configured using the logical full-mesh requirement of internal Border Gateway Protocol (iBGP). Instead of having all routers peering with every other router in a full mesh in autonomous system 100, each of routers 112 only peers with route reflector 120 and possibly shadow route reflector 180.

In an embodiment, autonomous system 100 comprises two or more shadow route reflectors 180. A first shadow route reflector 180 is denoted as a second plane route reflector and a second shadow route reflector 180 is denoted as a third plane route reflector. Hence, while the best path generated by the best-path route reflector (first plane route reflector) may be referred to as the best path, the best path generated by the first shadow route reflector 180 (second plane route reflector) may be referred to as the second best path, the best path generated by the second shadow route reflector (third plane route reflector) may be referred to as the third best path, and so forth.

In an embodiment, route-reflection inside an autonomous system defines a client relationship and a non-client relationship among BGP peers.

The best-path route reflector 120 may act as a focal point for iBGP sessions, and centrally manage and distribute reachability information. One or more routers 112 may peer with best-path route reflector 120 and may become the best-path route reflector's clients.

In an embodiment, both best-path route reflector 120 and shadow route reflector 180 propagate routes inside the autonomous system 100 according to the following logic: if a route is received from a non-client-peer, then the route is reflected to the clients only; if a route is received from a client-peer, then the route is reflected to all non-client-peers and also to all client-peers, except to the originator of the route; if a route is received from an external-BGP-peer, then the route is reflected to all clients and all non-client-peers.

In an embodiment, best-path route reflector 120 comprises best path calculation logic 122, BGP logic 124 and operating system 126. Best path calculation logic 122 comprises circuits or program instructions that are configured to perform the best path calculation functions that are further described herein. BGP logic 124 comprises circuits or program instructions which when executed implement BGP. Operating system 126 comprises circuits or program instructions which when executed implement a device operating system. An example of operating system 126 is Cisco IOS® Software from Cisco Systems. In an embodiment, executing BGP logic 124, the best-path route reflector 120 collects advertisements containing path reachability information from other routers and stores the paths in a connectivity database 150. By executing best path calculation logic module 122, the best-path route reflector 120 retrieves paths from connectivity database 150, determines the best path from the retrieved paths to each of the destinations in network 160 and advertises the best path to each of the destinations in network 160 to other routers.

Adding shadow route reflectors for each existing best-path route reflector allows computing the second best path, the third best path, and so forth. The best-path route reflector may be referred to as the first plane route reflector. The best-path route reflector still computes the best path to each destination and advertises the best path to each destination to its peers, including both clients and non-client iBGP peers, based on route-reflection rules.

In an embodiment, a first shadow route reflector is referred to as the second plane route reflector. The second plane route reflector computes the second best path and advertises it to its peers, including both clients and non-client iBGP peers, based on route-reflection rules. A second shadow route reflector is called the third plane route reflector. The third or $n^{th}$ plane route reflector computes the third or $n^{th}$ best path and advertises it to its peers, including both clients and non-client iBGP peers based on route-reflection rules. Embodiments may be use any number of shadow route reflectors and best paths and first, second, and third route reflectors and best paths are described herein solely to illustrate a clear example.

In an embodiment, all shadow route reflectors and the best-path route reflector have fully meshed iBGP peering established among them. In an embodiment, the best-path or first plane route reflector is configured with a command to cause attaching the new well-known community attribute disclosed herein while advertising the best path. In this approach, a route reflector may be configured as a shadow route reflector using special commands that comprises information about the plane for which the shadow router is configured. In an embodiment, the best-path/first plane route reflector is also configured, using a specified command, to cause the route reflector to attach the well-known extended community attribute value while advertising the best path.

In an embodiment, a shadow route reflector 180 comprises shadow route reflector best path calculation logic 182, BGP logic 184 and an operating system 186. Shadow route reflector best path calculation logic 182 comprises circuits or program instructions that are configured to perform the best path calculation functions that are further described herein. BGP logic 184 comprises circuits or program instructions which when executed implement BGP. Operating system 186 comprises circuits or program instructions which when executed implement a device operating system. By executing BGP logic 184, the shadow route reflector 180 collects advertisements containing path reachability information from other routers and stores the paths in a connectivity database 190. By executing shadow route reflector best path calculation logic module 182, the shadow route reflector 180 retrieves paths from connectivity database 190, determines the second best path from the retrieved paths to each of the destinations in network 160 and advertises the second best path to each of the destinations in network 160 to other routers.

In an embodiment, the best-path route reflector 120 and shadow route reflector 180 receive one or more path advertisements 130 from one or more routers 112. Path advertisements 130 contain reachability information to the destinations, to which autonomous system 100 provides connectivity. For example, path advertisements 130 may comprise information about IP prefixes to which autonomous system 100 may direct data flows. Path advertisements 130 may be stored in connectivity databases 150, 190 or any other connectivity database or data storage.

Using the reachability information stored in data storage 150, the best-path route reflector 120 generates its own best paths to given destinations and advertises its own best paths to other routers. The best path may be the best in terms of the length, the number of hops along the path, the quality of service settings, reliability, and number of re-transmissions along the path, or any other criteria that is important for transmitting data flows via the autonomous system 100. Other criteria that may be used include values of the LOCAL_PREF attribute, SHORTEST_AS_PATH attribute, lowest origin type, MED value, whether the route has been learned through an EBGP peer or an IBGP peer, IGP metric values, whether the route is older or newer, etc.

In an embodiment, the best path advertisement 140, generated by the best-path route reflector 120, includes the best path information and the best-path route reflector's well-known community attribute's value of "1." The well-known community attribute value not only indicates the rank of the best path that has been calculated and advertised by this reflector but also indicates the ranking of the reflector that among other plane reflectors.

Using the reachability information stored in data storage 190, the shadow route reflector 180 generates its own best paths to given destinations and advertises its own best paths to other routers. The best path may be the best in terms of the length, the number of hops along the path, the quality of service settings, reliability, and number of re-transmissions along the path, or any other criteria that is important for transmitting data flows via the autonomous system 100. Generating a best path also involves excluding non-diverse paths according to the path advertised by the best-path route reflector 120.

In an embodiment, the best path advertisement 140, generated by the shadow route reflector 180, includes the best path information and the well-known community attribute's value inserted by the shadow route reflector 180. The well-known community attribute value indicates the ranking of best path of the shadow route reflector 180 among all other best paths that are computed by the other shadow route reflectors 180, and the best path route reflector 120.

3.0 Process of Selecting a Best Path by a Route Reflector

In an embodiment, route reflectors compute multiple diverse paths to a destination. In some embodiments, computing the multiple diverse paths to the destination and reflecting the diverse paths to devices in a network improves resilience of the network, improves the recovery time necessary for the network to recover from a failure and improves overall load balancing in the network. Further, selecting and disseminating diverse best path paths provides the routers of an autonomous system 100 with knowledge about the alternative exit points from the autonomous system 100 to other autonomous systems.

In an embodiment, each plane route reflector, such as the best-path route reflector and each of the shadow route reflector(s), is configured to inform the router about which plane it belongs to and which best-path it is supposed to calculate. With such a configuration, the $i^{th}$ plane route reflector for example is instructed to calculate the $i^{th}$ best path, and informed that it is the $i^{th}$ plane route reflector. In an embodiment, full mesh iBGP peering between the best path route reflector and among all of the corresponding shadow route reflectors is provided or assumed to be present. In an embodiment, using the well-known community value, a particular plane route reflector does not need to receive data indicating which of its neighbors is another plane's route reflector, or to which plane this neighbor belongs. In an embodiment, using the well-known community value, each plane route reflector only needs to receive data specifying whether the received available path is the best path of a lower-ranked device or a higher-ranked device, which can be determined by comparing the well-known community value of the received available path with "i" at the $i^{th}$ plane route reflector.

As an alternative to exchanging well-known community values with best-paths calculated and advertised by different plane route-reflectors, each plane route reflector may have additional configuration specifying which of its neighbors belong to which plane. In any such embodiment, since full mesh iBGP peering between the best path router reflector and among all of the corresponding shadow route reflectors is provided, configuration data regarding neighbor relationships can be extended to include additional information about which neighbor belongs to which plane. In this alternate implementation, the well-known community attribute is not needed in path advertisements. Each route reflector can associate the rank of the available path with the rank of the neighbor it was received from. For example, if at $i^{th}$ plane route reflector, neighbor "X" was configured with value "j" to mean that this neighbor is the $j^{th}$ plane route reflector, then the available path received from neighbor "X" must have rank of "j" and it is the $i^{th}$ best path. At the $i^{th}$ plane route reflector, if i>j, then the received available path is the best path of a lower-ranked device. Otherwise, the received available path is the best path of a higher-ranked device.

In an embodiment, a value of the well-known community attribute that will be used by a particular route reflector while advertising its best path is a parameter that indicates a rank of the particular route reflector of an autonomous system within that reflector's hierarchical of the autonomous system among all other route reflectors calculating diverse paths. For example, in an autonomous system with one best-path route reflector and one shadow route reflector, the best-path route reflector (first plane reflector) is the highest-ranked reflector, while the shadow route reflector (second plane reflector) is the second highest ranked reflector. Hence, a value of the well-known-community value associated with the best-path route reflector may be "1," while a value of the community value associated with the shadow route reflector may be "2."

In an embodiment, the route reflectors engaged in calculating diverse paths advertise their paths with the respective well-known community attribute values, while the reachability information computed by other routers or route reflectors is advertised without this particular well-known community attribute values. For example, the best path computed by the best-path route reflector may be advertised with the community attribute value of "1;" the best path computed by the second plane route reflector may be advertised with the community attribute value of "2" for the best path computed by the third plane route reflector may be advertised with the community attribute value of "3," and so forth.

In an embodiment, using reachability information stored in a connectivity database, the best-path route reflector computes the best path to each destination to which the autonomous system has a connection. An IP address may represent a destination. The first shadow route reflector computes the second best path to each destination. The second shadow route reflector computes the third best path to each destination, and so forth.

The best path is computed based on all reachability information available to the best-path route reflector. The second best path is computed in such a way that the second best path is different from the best path. Hence, the second best path leads to an egress router that is different from the egress router of the best path computed by the best path router. The third best path is computed in such a way that the third best path is different from the best path and the second best path, and leads to an egress router that is different from the egress router of the best path and the egress router of the second best path.

FIG. 2 illustrates an embodiment of a process of selecting the best path by a route reflector.

In step 202, a path advertisement with an available path and possibly with the new well-known-community values disclosed herein is received by a route reflector. Independent of whether the new well-known community values are received along with the available path, the available path may be stored in a connectivity database and may be used for the best path calculation of this route reflector later.

However, if the path advertisement comprises the specified well-known community value of i, then the received path is the best path computed and advertised by another route reflector of another plane. For example, if the path advertisement comprises the community value of "1," then the advertised best path is the best path of the best-path route reflector because the community value of "1" indicates the highest ranked route reflector. Upon generating its best path, the best-path route reflector associates the value of the well-known community attribute of "1" to indicate that the advertised path was the best path to a particular destination, and to indicate that the best path was generated by the highest-ranked route reflector. In addition, upon generating its best path, the best-path route reflector set its local preferences of the path to "1," to make sure that receiving router would not prefer it on its best-path calculation.

If the path advertisement comprises the community value of "2," then the advertised best path is the second best path to a particular destination, and the second best path was generated by the second plane route reflector because the well-known community value of "2" indicates the second plane route reflector. Upon generating its best path, the second plane route reflector associated the value of community attribute of "2," to indicate that the advertised path was the second best path to the particular destination, and to indicate that the best path was generated by the second-in-rank route reflector. In addition, upon generating its best path, the second plane route reflector set its local preference of the path to "1," to ensure that receiving router would not prefer it during its best path calculation.

If the path advertisement comprises the community value of "3," then the advertised best path is the third best path to a particular destination, and that the third best path was generated by the third plane route reflector because the community value of "3" indicates the third plane route reflector. Upon generating its best path, the third plane route reflector associated the value of community attribute of "3," to indicate that the advertised path was the third best path to the particular destination, and to indicate that the best path was generated by the third-in-rank route reflector. In addition, upon generating its best path, the third plane route reflector sets its local preferences to "1," to ensure that the receiving router would not prefer it during its best path calculation. The preceding processing may be generalized and performed similarly for an $i^{th}$ plane route reflector.

In the preceding description, example values are used and three (3) planes are described solely for illustrating a clear example. The approach herein may be generalized for use with any number i of route reflectors and references to the first, second, third route reflector may refer to an $i^{th}$ plane route reflector.

In an embodiment, in addition to relying on the well-known community value to rank the diverse paths, the route reflectors may set the local preference of their best paths to minimal values before advertising to further improve the stability. For example, for a remote Provider Edge (PE) node it may be irrelevant which route reflector is advertising a particular best path as long as the advertised best paths are diverse. For instance, if the best path, generated by the best-path route reflector, leads via a node PE1, the second best path leads via PE2, and the link between PE1 and the best-path route reflector failed, then, assuming that the local preference is not set to the minimal value at any of the reflectors before announcing the best path, the best-path route reflector will chose the second best path (via PE2) as its own best path, and the shadow route reflector will chose the best path (via PE1) as its own best path. However, when the link between PE1 and the best-path route reflector recovers from the failure, the best-path route reflector will switch its best path to the path via PE1, and that will cause the shadow route reflector to switch its best path to the path via PE2. To prevent the instability of the network during the time when a particular link fails and tries to recover from the failure, the best-path router reflector and shadow route reflectors may use the local preference settings. Setting the local preference of the best paths to a minimal value before advertising improves stability since it helps preventing the routers unnecessarily preempt and switch the best paths in case of faulty links for example.

In step 206, the available path is stored in a connectivity database, along with the new well-known community value disclosed herein, if it is present.

In step 210 the process performs a modified best path calculation in response to receiving the available path either from a higher-ranked device or lower-ranked device or from a device that is not taking part in diverse path calculation. During the calculation of the particular best-path, each path that has been learned and stored in the connectivity database is examined to check if it is from a higher-ranked device. The method excludes all the higher-rank device learned paths in the connectivity database during the calculation of a particular best path. Furthermore, the method also excludes the paths for which the next-hop values match any next-hop value of the paths that have been learned from a higher-ranked device. Such exclusions of the paths during the calculation of a particular best path prevent the route reflector from computing a best path that is identical to any of the best paths already computed by the higher-ranked devices. It also prevents the route reflector to calculate a particular best path that is not diverse.

The best path calculated this way becomes the particular best path of this route reflector. For example, it is the $i^{th}$ best path if the route reflector is $i^{th}$ plane router reflector.

For instance, if a path in the connectivity database is received with the well-known community attribute value of "1" and the route reflector that is calculating its best path is the third plane route reflector, then third plane route reflector will exclude this path during its best path calculation since the path with well-known community attribute value of 1 is the best-path router reflector's path and it is higher ranked than the third plane route reflector's best path. More precisely, from the paths that are received from peers and stored in the connectivity database, the following are excluded in the best path calculation of $3^{rd}$ plane route reflector: received paths with well-known community values that are less than "3"; the paths with the same next-hop as the paths with well-known community values that are less than "3". The values "1", "3" merely provide examples and the same approach may be generalized and applied for a path that is received with a well-known community attribute value of i that is received at a $j^{th}$ plane route reflector.

The best path determined in the preceding modified calculation may be advertised at step 212.

The usage of the specified well-known community attribute as described herein enables a router to order or rank the best paths generated by the route reflector of various planes and provides a mechanism for preemption of the best paths generated by lower-ranked devices. For example, the best path generated by the second plane route reflector may be preempted by the first plane reflector, while the second plane route reflector may preempt the best path generated by the third plane route reflector.

Furthermore, the first plane route reflector may have a best path of its own choice, and none of the shadow route reflectors may force the first plane route reflector to give up its own best path. Similarly, a third plane route reflector cannot make a second plane route reflector to give up its chosen best path, and a fourth plane route reflector cannot make a first, second or third plane route reflector give up its respective best path.

The approach of step 210 excludes all the paths that have been selected as the best paths by the higher-ranked devices, and which should not be used by the route reflector that received the path advertisement in computing the respective route reflector's best path. For example, if the respective route reflector is a second plane route reflector, then the best path selected by the best-path route reflector should not be used in computing the second best path so that the best paths computed by the first and second plane route reflectors can be diverse. However, if the route reflector is a first plane route reflector, then none of the paths stored in the connectivity database associated with the second plane route reflector and third plane route reflector, or any shadow route reflector, should be excluded during the best path calculation.

Furthermore, all the paths with the matching next-hop to the paths that have been excluded as described above and all the paths with the matching path originator identifier should be excluded during best path calculation. This approach excludes the paths that have the same exit points as the best paths that have been selected as the best paths by the higher-ranked devices, which should not be used by the route reflector that received the path advertisement in computing the respective route reflector's best path. For example, if the respective route reflector is the third plane route reflector, then the best path selected by the best-path route reflector and the best path selected by the second plane route reflector should not be used in computing the third best path. Moreover the paths whose next-hop is the same as the next-hop of the best path selected by the best-path route reflector and the best path selected by the second plane route reflector should not be used in computing the third best path.

If the route reflector is the first plane route reflector, then the computed best path is the best path to a particular destination. If the route reflector is the second plane route reflector, then the computed best path is the second best path to the particular destination. If the route reflector is the third plane route reflector, then the computed best path is the third best path to the particular destination, and so on for n best paths.

4.0 Structural and Functional Overview of a Group of Autonomous Systems

Figure 3:
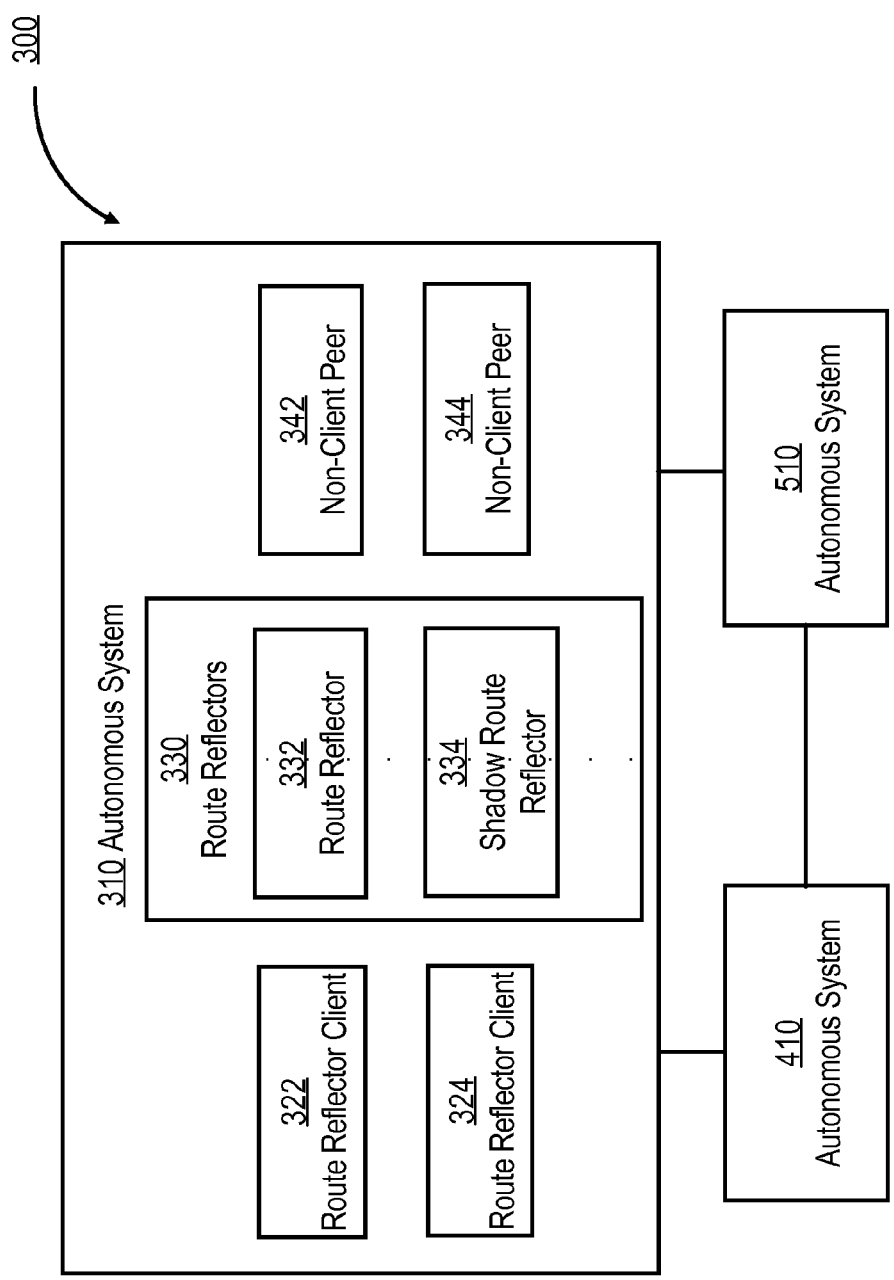
FIG. 3 illustrates an embodiment of a group of autonomous systems.
Figure 4:
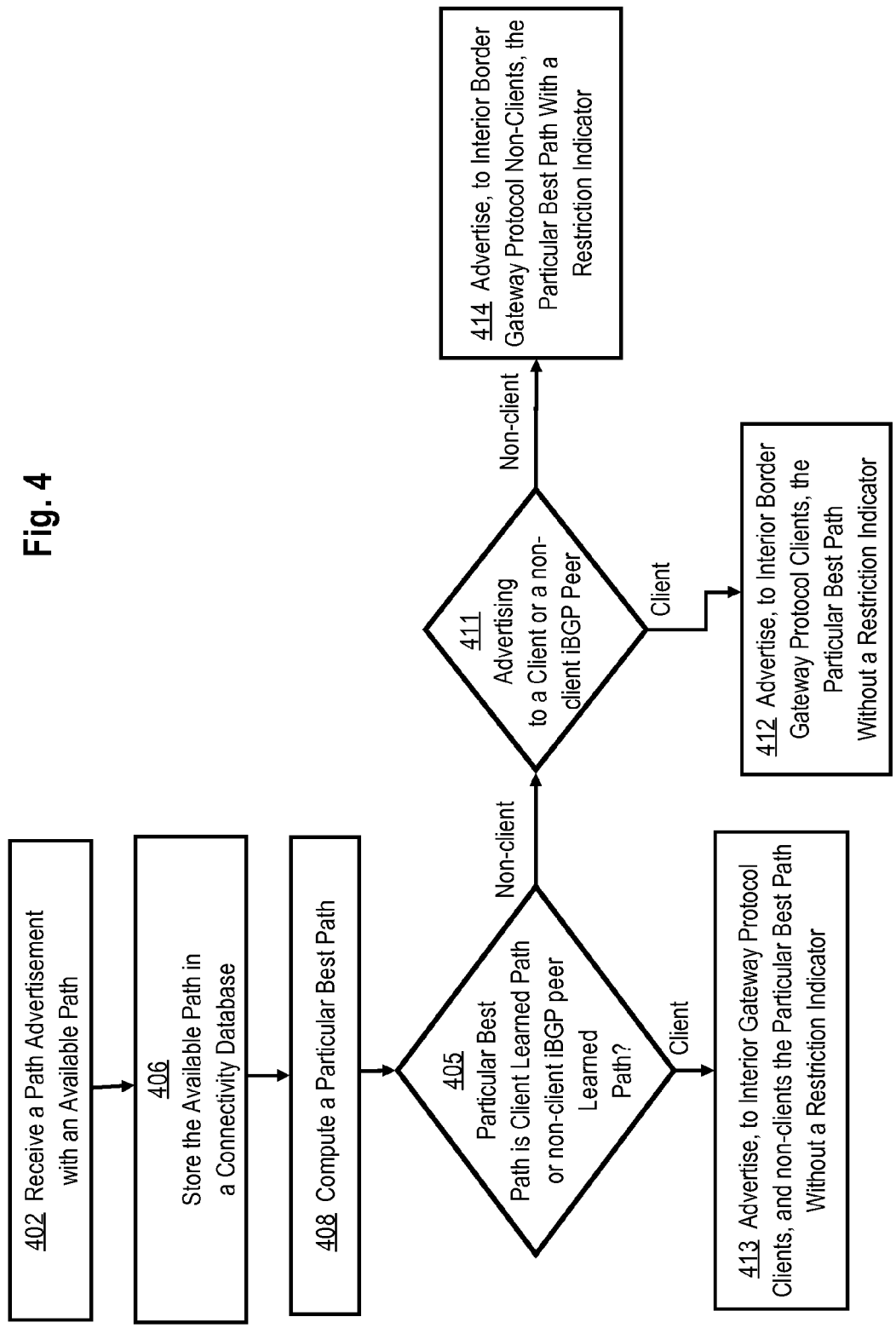
FIG. 4 illustrates an embodiment of a process of selecting the best paths by route reflectors.

FIG. 3 illustrates an embodiment of a group of autonomous systems; FIG. 4 illustrates an embodiment of a process of selecting the best paths by route reflectors; and FIG. 5 illustrates a computer system upon which an embodiment may be implemented.

Referring first to FIG. 3, in an embodiment, a group of autonomous systems 300 comprises three or more autonomous systems (AS) 310, 410 and 510. For purposes of illustrating clear examples, FIG. 3 shows that the group 300 comprises three autonomous systems 310, 410, 510. However, practical embodiments may use any number of autonomous systems. Further, for purposes of clarity, full mesh iBGP peering relationships between the routers and systems are omitted.

A BGP router within an autonomous system (AS) is termed an internal BGP (iBGP) router, or an interior Border Gateway Protocol (iBGP) router. A BGP router that is running between autonomous systems is termed an external BGP (eBGP) router, or an exterior Border Gateway Protocol (eBGP) router.

In an embodiment, each of the autonomous systems 310, 410, 510 comprises one or more routers configured to transmit reachability information in compliance with a data transmission protocol. For example, the autonomous systems 310, 410, 510 may communicate reachability information according to iBGP, described above.

In an embodiment, iBGP routers may be divided into route reflectors, route reflector clients and non-client peers. Referring again to FIG. 3, autonomous system 310 comprises a best-path route reflector 332, one or more shadow route reflectors 334, one or more route reflector clients 322, 324, and one or more non-client peers 342, 344. The best-path route reflector 332 and shadow route reflectors 334 were described in detail in FIG. 1 above. For purposes of illustrating clear examples, FIG. 3 shows that autonomous system 310 comprises one best-path route reflector 332, one shadow route reflector 334, two route reflector clients 322, 324, and two non-client peers 342, 344. However, practical embodiments may use any number of shadow route reflectors 334, any number of route reflector clients 322, 324, and any number of non-client peers 342, 344.

In an embodiment, route reflectors advertise updates received from an iBGP peer to other iBGP peers under specific conditions. Routes received from a route-reflector-client are reflected to other clients and non-client neighbors. Routes received from non-client neighbors are reflected to route-reflector-client neighbors only.

Furthermore, the route reflectors may set the originator-ID attribute in the reflected update if the originator-ID attribute has not been set. Moreover, the route reflectors may add the cluster-ID to a cluster-list attribute in the reflected update.

In an embodiment, because autonomous system 310 with internal BGP (iBGP) routers comprises route reflectors, the autonomous system 310 may not have all its iBGP peers connected to each other in a full mesh. Implementation of the route reflectors 332 and 334 allows reducing the number of iBGP peers to each router and thus reduces the amount of the processing overhead.

In an embodiment, once a BGP session between a BGP speaker and a route reflector is running, the BGP speaker exchanges UPDATE messages about destinations to which the BGP speaker offers connectivity. UPDATE messages may comprise Classless Inter Domain Routing (CIDR) route descriptions in the form of Network Layer Reachability Information (NLRI). NLRI includes various attributes, such as the expected destination prefix, prefix length, path of autonomous systems to the destination and next hop, etc. BGP speakers incrementally announce new NLRI to which they offer reachability, but also announce withdrawals of prefixes to which the speaker no longer offers connectivity.

5.0 Process of Selecting the Best Paths by Route Reflectors

In the "Diverse Path" approach, described in "draft-raszuk-diverse-bgp-path-dist-00," the first plane route reflector and its shadow route reflectors may or may not be peering with each other. Even if they are peering, they lack any mechanism to identify the best path advertised by either the first plane route reflector or any other plane route reflectors.

Consequently, the planes may not know about best paths of each other. Further, the "Diverse Path" approach may require that each shadow route reflector executes several iterations of the best path computations before the reflector determines its own best path. For example, the second best path calculation may require two iterations, and calculation of the "$i^{th}$" best path may require "i" iterations. This can be CPU intensive and may exacerbate convergence delay upon a route change.

In the "Diverse Path" approach, the best path calculation performed by a third plane route reflector may require three iterations. The first iteration of the best path selection algorithm may be performed to merely guess the best path that has been chosen by the best-path route reflector, so that the best path of the best-path route reflector may be excluded from the computation of the second best path. The second iteration of the best path selection algorithm may be performed to guess the best path that has been chosen by the second plane route reflector, so that the second best path may be excluded from the computation of the third best path. In general, finding the "$i^{th}$" best path may require guessing the first, second . . . $(i-1)^{th}$ best paths that have been chosen by the higher-ranked route reflectors.

Since the "Diverse Path" approach assumes the existence of the same set of paths at the best-path route reflector and at each shadow route reflector, and each route reflector guesses the paths chosen by other route reflectors, all shadow route reflectors must have the same iBGP peering with the other routers as the best-path route reflector has within the original topology. This requirement of the "Diverse Path" proposal is an attempt to create parallel planes.

Further, the "Diverse Path" approach may require that an IGP metric check is omitted during the best path calculation by the best-path route reflector and by all shadow route reflectors. If the best-path route reflector and a shadow route reflector have different IGP metric to the same exit point, then the shadow route reflector may be wrong in its guess about the path that has been chosen by the best-path route reflector. Thus, a wrong path may be accidentally excluded from the best path calculation and the shadow route reflector may accidentally compute its own best path to be identical to the best path computed by the best-path route reflector. Subsequently, the path diversity would be lost.

Embodiments as disclosed herein provide a relatively efficient calculation of the diverse paths, and do not require several iterations while the diverse paths are computed.

In an embodiment, the best-path route reflector and all the shadow route reflectors are fully meshed. Because iBGP sessions are established between different plane route reflectors and each route reflector has a mechanism to detect the best-paths chosen by the other plane router reflectors, the shadow route reflector that is responsible for calculating, for example, the second best path can learn the exact best path chosen by the best-path route reflector (first plane route reflector) when that the best-path route reflector sends an advertisement about its own best path.

In an embodiment, a shadow route reflector may be peering with many routers and receive many advertisements from different route reflectors. The relationship between the shadow route reflector and the best-path route reflector may be specified by a network administrator who can specify respective configuration files and execute them so that the best-path route reflector knows its shadow route reflectors and so that the shadow route reflector knows its best-path route reflector. Similarly, the relationship between the shadow route reflectors may be specified by a network administrator who can specify respective configuration files and execute them so that a particular shadow router reflector knows about all other shadow route reflectors and all other shadow route reflector know about this particular shadow route reflector.

In an embodiment, the $i^{th}$ plane route reflector can be a client of the $i^{th}$ plane route reflector for any i and j where 1<i, j<N and N is the number of diverse paths that is being calculated or supported. In such case, the $i^{th}$ plane route reflector will advertise its best path, $j^{th}$ best path, to the $i^{th}$ plane route reflector. The route reflection rules guarantee such advertisement; therefore the $i^{th}$ plane route reflector is guaranteed to learn about the $i^{th}$ plane route reflector's best path.

In an embodiment, the $i^{th}$ plane route reflector and the $i^{th}$ plane route reflector can be non-client iBGP peers for any i and j, where for 1<i, j<N and N is the number of diverse paths that is calculated or supported. In such a case, if the $i^{th}$ plane route reflector's best path is a client learned path, then according to route reflections rules, it will be advertised to the $j^{th}$ plane route reflector. The symmetric case is also true.

However, if the best path of $j^{th}$ plane route reflector is a non-client iBGP learned path, then it is advertised only to the clients of the $j^{th}$ plane route reflector.

This is due to established route reflection rules that prevent the $i^{th}$ plane route reflector from learning about the $j^{th}$ plane route reflector's best path. For this particular case, in an embodiment, standard route reflection rules are relaxed so that it is guaranteed that the $i^{th}$ plane route reflector can learn about the $j^{th}$ plane route reflector's best path. However, relaxing the route reflection rules as mentioned above may lead to routing loops. To prevent such potential routing loops, the $j^{th}$ plane route reflector attaches the well-known community attribute value of "NO-ADVERTISE" while advertising its non-client iBGP learned best path to another non-client iBGP peer such as $i^{th}$ plane route reflector. Receiving a path advertisement with the well-known community attribute value "NO-ADVERTISE" as well as with the new well-known community value of "j" as disclosed herein informs the $i^{th}$ plane shadow route reflector that this particular best path advertisement is for the $j^{th}$ best path but it needs to be processed in a special way.

In an embodiment, upon receiving a path advertisement comprising information about a path (route) and a well-known community attribute value of "NO-ADVERTISE," the $i^{th}$ plane router reflector does not install the received route to its Forwarding Information Base (FIB) or RIB, and does not re-advertise the received advertisement any further. The learned $j^{th}$ best path will be used by this $i^{th}$ plane route reflector only to exclude the $j^{th}$ best path and the other paths with the same next-hop value while calculating the $i^{th}$ best path.

In an embodiment, all shadow route reflectors and the best-path route reflector have established iBGP peering sessions between each other. Furthermore, each route reflector is configured in such a way that the ranking information about of the route reflector is stored in the router's configuration file. For example, the router configuration file of the best-path route reflector comprises information that the router is responsible for calculating the best path to a given destination. According to another example, the router configuration file of the second plane route reflector (first shadow route reflector) comprises information that the second plane route reflector is responsible for calculating the second best path to a give destination.

FIG. 4 illustrates an embodiment of a process of selecting the best paths by route reflectors. In step 402, a path advertisement comprising information about an available path is received at a route reflector. The path advertisement may be received from a router's client, or a router's non-client iBGP peer. (For the path advertisements received from eBGP peers, the default behavior applies.) The path advertisement may contain information about the best path computed by one of the other plane route reflectors, or may contain reachability information provided by a router that is not involved in diverse path calculation.

If the path advertisement does not comprise a well-known community value indicating that the received path is the $i^{th}$ best path, then the available path is not computed by any of the other route reflectors that are working towards finding diverse paths. Such paths are not excluded during best path calculation if the receiving route reflector is either the best path route reflector or a shadow route reflector. If the received path comprises a well-known community value indicating that the received path is the $i^{th}$ best path, then it is known that the path is computed by the $i^{th}$ plane route reflector.

In step 406, the available path from the path advertisement is stored in a connectivity database.

In step 408, the best-path route reflector computes a particular best path using all information available in the connectivity database. The $j^{th}$ plane route reflector computes its best path by excluding all the paths with well-known community value less than j. It also excludes all the paths with the same next-hop that have been excluded due to their well-known community value.

The $j^{th}$ best path may be computed using any of several known algorithms for that purpose.

In step 405, the process tests whether the particular best path was learned from a client or was learned from a non-client iBGP peer. If the particular best path was learned from a client, then in step 413, the process advertises, to iBGP clients except the one that is learned from and to non-clients, the particular best path without a restriction indicator.

Alternatively, if the test of step 405 indicates that the particular best path was learned from a non-client iBGP peer, then in step 411 the process tests whether the advertisement of the particular best path is being directed to a client or to a non-client iBGP peer. When the particular best-path is being advertised to the client peers, in step 412, the process advertises the particular best-path without a restriction indicator. When the particular best-path is being advertised to the non-client iBGP peers, in step 414, the process advertises the particular best-path with a restriction indicator.

The process of FIG. 4 takes into account the fact that advertising a non-client iBGP learned best path to non-client iBGP peers is not allowed with regular route reflection rules due to potential routing loops. However, in an embodiment this rule is relaxed so that the peers of the current route reflector, for example, the $j^{th}$ plane route reflector, can communicate its best path to route reflectors of other planes even when they have a non-client iBGP peering session. In such cases, the $j^{th}$ plane route reflector advertises its non-client iBGP learned path to the other non-client iBGP peers if they are route reflectors of other planes and have to learn about the best path that has been chosen by this $j^{th}$ plane route reflector. To prevent potential loops this may create, the process makes use of an existing well-known community value "NO-ADVERTISE" the $j^{th}$ plane route reflector includes an existing well-known community attribute value "NO-ADVERTISE" in the advertisement of $j^{th}$ best path to non-client iBGP peers when $j^{th}$ best path is a non-client iBGP peer learned path. In an embodiment, the "NO-ADVERTISE" value is included as the restriction indicator in the advertisement of step 414 to prevent the recipients of the path advertisement from disseminating the advertisement any further.

In contrast, the restriction value "NO-ADVERTISE" is not included in the advertisement sent to the iBGP clients at step 412, 413 because the existing route reflection rules allow advertising the overall best path of a route reflector to its clients even if the overall best path of a route reflector is an iBGP non-client learned path. Therefore, if a $j^{th}$ plane route reflector is a client of an $i^{th}$ plane route reflector, it is guaranteed that the $i^{th}$ plane route reflector will always advertise $i^{th}$ best path to the $j^{th}$ plane route reflector. The route reflection rules will not prevent this from happening. Since this case follows the existing route reflection rules, there is no potential danger of creating loops by letting the $i^{th}$ plane route reflector to advertise its best path to the $j^{th}$ plane route reflector.

6.0 Deployment Considerations

The approach with multiple route reflectors computing and advertising diverse paths that are unique to those route reflectors may, in some embodiments, increase network resilience and provide path redundancy. The route reflectors may be configured with an identical cluster's identifier, and may be connected with each other via iBGP sessions. The usage of the well-known community value of "NO-ADVERTISE" in the advertisements sent to iBGP non-clients when the overall best path is a non-client iBGP learned path prevents potential routing loops that could have otherwise occurred by relaxing route reflection rules that would otherwise be enforced.

Embodiments may be efficient and deterministic in calculation of diverse paths, and may provide a relatively fast convergence and improved stability. In some embodiments, network topology may stay intact and there may not be any need to introduce new hardware.

The improvement disclosed herein does not require ignoring the IGP metric check during the best path calculation depending on the relative locations of different plane route reflectors. Therefore, it allows to both diverse path functionality and hot potato routing functionality.

Networks designed with route reflectors typically deploy multiple route reflectors to serve the same set of clients to provide redundancy. These route reflectors are configured with an identical cluster_id attribute value and are connected to each other with iBGP sessions. However, to prevent potential routing loops, the route reflectors drop the advertisements that are received from each other. A received advertisement received carries the same cluster_id as the receiving router reflector. Both the primary and redundant route reflector select the same best path, and the redundant router reflector sends a second copy of the best path. For networks requiring only a few diverse paths (rather than N>3), the approach herein may take advantage of the existence of primary and redundant route reflectors and avoid the need to add new hardware. The redundant route reflectors can be upgraded to calculate and advertise the $2^{nd}$ best path instead of sending the second copy of the best path.

In this approach, it is not necessary that the redundant route reflector keep track of two paths at the same time, i.e., $2^{nd}$ best path, and a copy of the best path. Instead, unless the primary router reflector fails, then there is no harm for the redundant route reflector to calculate and advertise the $2^{nd}$ best path. If the primary router reflector fails, withdrawal requests will be sent to a redundant route reflector with the "NO-ADVERTISE" well-known community as explained above. This will trigger the $2^{nd}$ best path re-calculation at redundant route reflector. In response, since there was no best path learned from the primary route reflector, there will not be any best path to be excluded during the calculation of the $2^{nd}$ best path. Therefore, the redundant route reflector will chose the best path and advertise it. Since redundant route reflector can dynamically switch back and forth between behaving like either a shadow route reflector calculating $2^{nd}$ best path (while the primary is up) or a regular redundant route reflector (while the primary is down), the approach herein is readily deployed to provide a limited number of diverse paths, i.e., N>3, which is enough for many networks.

7.0 Implementation Mechanisms—Hardware Overview

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 518. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

According to one embodiment, compliance management is provided by computer system 500 in response to processor 504 executing one or more sequences of one or more instructions contained in main memory 506. Such instructions may be read into main memory 506 from another computer-readable storage medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 504 for execution. Such a medium may take many forms, including but not limited to, non-transitory and non-volatile storage media and non-transitory volatile storage media. Non-volatile storage media includes, for example, optical or magnetic disks, such as storage device 510. Volatile storage media includes dynamic memory, such as main memory 506.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for compliance management as described herein. The received code may be executed by processor 504 as it is received, and/or stored in storage device 510, or other non-volatile storage for later execution.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method performed by one or more processors comprising a data packet router, the method comprising:
receiving, at the data packet router, a path advertisement comprising information about an available path and a well-known community value associated with the available path, wherein the well-known community value indicates a rank of a device that computed the available path;
comparing the community value associated with the available path with a router community value assigned to the data packet router which received the path advertisement to determine whether the community value associated with the available path is lesser than the router community value assigned to the data packet router;
in response to determining that the community value associated with the available path is lesser than the router community value assigned to the data packet router, computing, using data stored in a connectivity database, a particular best path;
in response to determining that the community value associated with the available path is not lesser than the router community value associated with the data packet router, storing the information about the available path in the connectivity database, computing the particular best path using data stored in the connectivity database;
advertising, to other routers, the particular best path with the router well-known community value associated with the data packet router.

2. The method of claim 1, comprising determining that the available path is a lower-ranked device best path in response to determining whether the well-known community value associated with the available path is greater than the router well-known community value.

3. The method of claim 1, further comprising: in response to determining that the available path is the best path from a higher-ranked device, invalidating paths having associated well-known community values that are lesser than the well-known community value associated with the available path, and eliminating paths for which next-hop values match a next-hop value specified in the available path and which were originated by a particular originator that also originated the available path.

4. The method of claim 1, wherein the particular best path is different from the available path when next hop values of the particular best path and the available path are different.

5. The method of claim 1, further comprising: in response to determining that the available path does not have the associated well-known community value, storing the available path in the connectivity database.

6. A non-transitory computer-readable storage medium storing one or more sequences of instructions which, when executed by one or more processors comprising a data packet router, cause the one or more processors to perform:
receiving, at the data packet router, a path advertisement comprising information about an available path and a well-known community value associated with the available path, wherein the well-known community value indicates a rank of a device that computed the available path;
comparing the community value associated with the available path with a router community value assigned to the data packet router which received the path advertisement to determine whether the community value associated with the available path is lesser than the router community value assigned to the data packet router;
in response to determining that the community value associated with the available path is lesser than the router community value assigned to the data packet router, computing, using data stored in a connectivity database, a particular best path that is different from the available path;

in response to determining that the well-known community value associated with the available path is not lesser than a router-well-known community value associated with the data packet router, storing the information about the available path in the connectivity database, computing the particular best path using data stored in the connectivity database;

advertising, to other routers, the particular best path with the router well-known community value associated with the data packet router.

7. The computer-readable medium of claim 6, further comprising instructions which, when executed by the one or more processors, cause the one or more processors to perform determining whether the well-known community value associated with the available path is greater than the router well-known community value.

8. The computer-readable medium of claim 6, further comprising instructions, which when executed by the one or more processors, cause the one or more processors to perform in response to determining that the available path is the best path from a higher-ranked device, invalidating paths having associated well-known community values that are lesser than the well-known community value associated with the available path, and eliminating paths for which next-hop values match a next-hop value specified in the available path and which were originated by a particular originator that also originated the available path.

9. The computer-readable medium of claim 6, wherein the particular best path is different from the available path when next hop values of the particular best path and the available path are different.

10. The computer-readable medium of claim 6, further comprising instructions, which when executed by the one or more processors, cause the one or more processors to perform: in response to determining that the available path does not have the associated well-known community value, storing the available path in the connectivity database.

11. A method performed by one or more processors comprising a reflector, the method comprising:

receiving, at the reflector, a path advertisement comprising information about an available path and a well-known community value of a device that computed the available path;

comparing the community value associated with the available path with a router community value assigned to the reflector which received the path advertisement to determine whether the community value associated with the available path is lesser than the router community value assigned to the reflector;

in response to determining that the community value associated with the available path is lesser than the router community value assigned to the reflector, storing the available path in a connectivity database, computing a best path using data stored in the connectivity database, advertising, to clients, the best path without a restriction indicator, advertising, to non-clients, the best path with the restriction indicator;

in response to determining that the community value associated with the available path is not lesser than the router community value assigned to the reflector, computing, using the data stored in the connectivity database, a shadow best path that is different from any path learned from a higher-ranked device, advertising, to the clients, the shadow path without the restriction indicator, advertising, to the non-clients, the shadow best path with the restriction indicator.

12. The method of claim 11, further comprising determining that the reflector is the best-path route reflector in response to determining that the reflector well-known community value associated with the reflector indicates a highest-ranked reflector;

determining that the reflector is not the best-path route reflector in response to determining that the reflector well-known community value associated with the reflector does not indicate the highest-ranked reflector;

wherein the reflector, the higher-ranked device and a lower-ranked device are peers.

13. The method of claim 11, further comprising: invalidating paths having associated well-known community values that are lesser than the reflector well-known community value, and eliminating paths for which next-hop values match next-hop values specified in the paths learned from the higher-ranked device.

14. The method of claim 11, wherein the shadow best path is different from any path learned from a higher-ranked device when a next hop value of the shadow best path and next hops of the paths learned from the higher-ranked devices are different; wherein the restriction indicator comprises a "NO-ADVERTISE" label;

wherein clients are internal Border Gateway Protocol (iBGP) clients;

wherein non-clients are iBGP non-clients.

15. The method of claim 11, further comprising: in response to determining that the available path does not have the associated well-known community value, storing the available path in the connectivity database.

16. A non-transitory computer-readable storage medium storing one or more sequences of instructions which, when executed by one or more processors comprising a reflector, cause the one or more processors to perform:

receiving, at the reflector, a path advertisement comprising information about an available path and a well-known community value of a device that computed the available path;

comparing the community value associated with the available path with a router community value assigned to the reflector which received the path advertisement to determine whether the community value associated with the available path is lesser than the router community value assigned to the reflector;

in response to determining that the community value associated with the available path is lesser than the router community value assigned to the reflector, storing the available path in a connectivity database, computing a best path using data stored in the connectivity database, advertising, to clients, the best path without a restriction indicator, advertising, to non-clients, the best path with the restriction indicator;

in response to determining that the community value associated with the available path is not lesser than the router community value assigned to the reflector, computing, using the data stored in the connectivity database, a shadow best path that is different from any path learned from a higher-ranked device, advertising, to the clients, the shadow path without the restriction indicator, advertising, to the non-clients, the shadow best path with the restriction indicator.

17. The non-transitory computer-readable medium of claim 16, further comprising instructions which, when executed by the one or more processors, cause the one or more processors to perform determining whether the reflector well-known community value associated with the reflector indicates a highest-ranked reflector; determining whether the reflector well-known community value associated with the reflector does not indicate the highest-ranked reflector; wherein the reflector, the higher-ranked device and a lower-ranked device are peers.

18. The non-transitory computer-readable medium of claim 16, further comprising instructions, which when executed by the one or more processors, cause the one or more processors to perform determining that the reflector well-known community value associated with the reflector indicates a highest-ranked reflector if the community value associated with the path is lesser than the reflector community value associated with the reflector; determining that the reflector well-known community value associated with the reflector does not indicate the highest-ranked reflector if the well-known community value associated with the path is not lesser than the reflector well-known community value associated with the reflector; wherein the reflector, the higher-ranked device and a lower-ranked device are peers.

19. The non-transitory computer-readable medium of claim 16, wherein the shadow best path is different from any path learned from a higher-ranked device when a next hop value of the shadow best path and next hops of the paths learned from the higher-ranked devices are different; wherein the restriction indicator comprises a "NO-ADVERTISE" label;
  wherein clients are internal Border Gateway Protocol (iBGP) clients;
  wherein non-clients are iBGP non-clients.

20. The non-transitory computer-readable medium of claim 17, further comprising instructions, which when executed by the one or more processors, cause the one or more processors to perform: in response to determining that the available path does not have the associated well-known community value, storing the available path in the connectivity database.

* * * * *